United States Patent [19]

Smith

[11] Patent Number: 4,780,962
[45] Date of Patent: Nov. 1, 1988

[54] PIPELINE BEND VERIFICATION PIG

[75] Inventor: Dennis R. Smith, Tulsa, Okla.

[73] Assignee: T. D. Williamson, Inc., Tulsa, Okla.

[21] Appl. No.: 558,105

[22] Filed: Dec. 5, 1983

[51] Int. Cl.$^4$ .............................................. G01B 5/28
[52] U.S. Cl. ...................................... 33/523; 33/302; 33/304
[58] Field of Search ...................... 33/178 F, 312, 314, 33/304, 302, 523

[56] References Cited

U.S. PATENT DOCUMENTS

| | | | |
|---|---|---|---|
| 3,571,937 | 3/1971 | Sears ..................................... | 33/312 |
| 3,755,908 | 9/1973 | Ver Nooy .......................... | 33/178 F |
| 3,789,511 | 2/1974 | Groom et al. ......................... | 33/312 |
| 3,886,665 | 6/1975 | Lowen ................................ | 33/174 R |
| 4,228,593 | 10/1980 | Frank et al. ......................... | 33/178 F |
| 4,342,225 | 8/1982 | Jondera et al. ................... | 33/178 F |

Primary Examiner—William D. Martin, Jr.
Attorney, Agent, or Firm—Head & Johnson

[57] ABSTRACT

A pipeline pig device comprises a longitudinal housing of given length, having adjacent each end a substantially centralizing packer or seal by which pipeline fluids may be used to propel the device. Intermediate the longitudinal housing are a plurality of outwardly extending feeler arms which ride against the pipeline interior. Movement of the feeler arms caused by the pig traversing bends, miters or other deviations from straight, round pipe are transmitted to a recording system which, in combination with odometers, will provide information and/or changes in such bends.

9 Claims, 4 Drawing Sheets

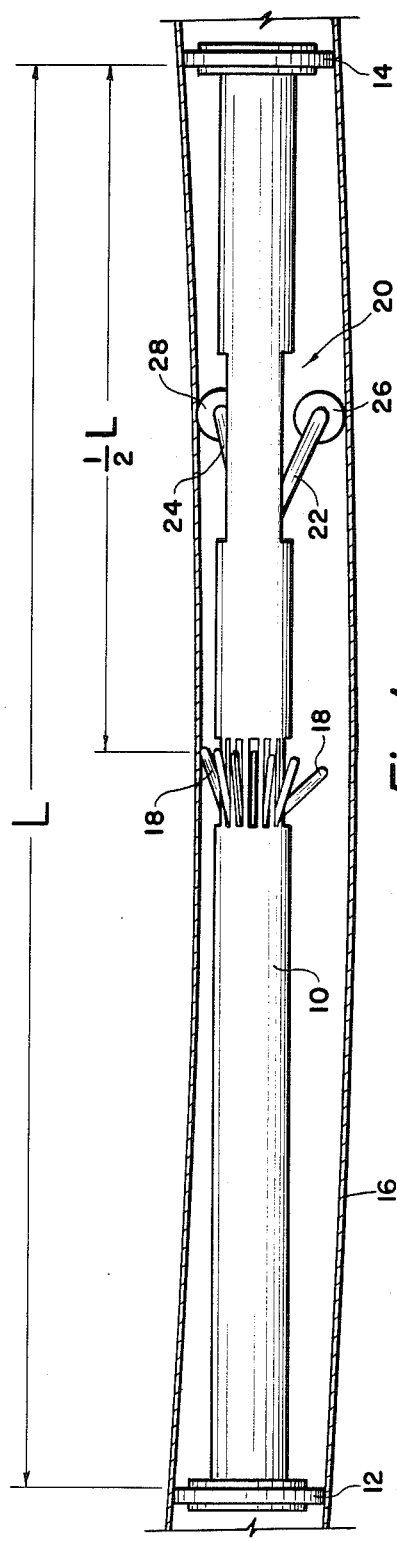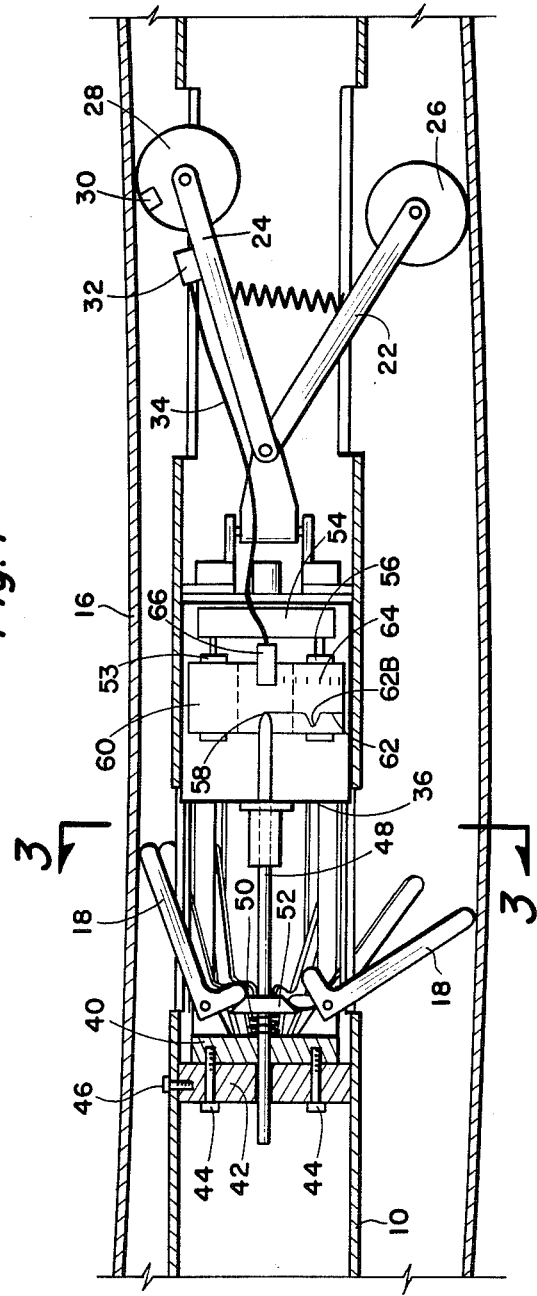

PIPELINE BEND VERIFICATION PIG

SUMMARY OF THE INVENTION

The object of this invention is to provide a pipeline pig having means to measure the encroachment of the inside of a bend relative to the cylindrical displacement of the pig. This encroachment or offset information is transmitted or otherwise recorded to provide information to pipeline operators as to identifiable bends or changes in radius, angle or deformation of a pipeline.

The present invention is an apparatus for verification of the interior wall configuration of a pipeline. The apparatus comprises an elongated, rigid body or housing member of diameter smaller than the interior diameter of the pipeline and suitable for safe traversal through the pipeline, preferably paralleled by pipeline fluids. The rigid body member defines a given longitudinal axis of given length. Cylindrical packers, seals or discs are positioned adjacent each end of the body member and are of diameter so as to slideably engage the interior wall of the pipeline and, therefore, act as a piston for movement therethrough by fluids within the pipeline.

Intermediate the cylindrical discs are a plurality of feeler arms circumferentially positioned about the body member and biased outwardly to normally engage the interior wall of the pipeline. Changes in location of the feeler arms relative to the axis of the longitudinal body member are transmitted to suitable recording devices such as that disclosed in U.S. Pat. No. 3,755,908, dated Sept. 4, 1983. The diameter or radius of a circle or of an arc of that circle can be determined if the relative positions of three points on that circular arc are established. Thus the relative positions of the end support members of the pig and the intermediate arm in contact with the pipe wall can be used to determine the apparent radius of the pipe curvature at said point of contact. Odometer measuring means provide distance information to verify the location of recorded apparent radii of the pipeline.

BRIEF DESCRIPTION OF THE DRAWINGS

FIG. 1 is an elevational view of the apparatus of this invention as seen in a cross-section of the pipeline.

FIG. 2 is a partial sectional view of a portion of the apparatus of FIG. 1.

DETAILED DESCRIPTION OF THE PREFERRED EMBODIMENT

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figure 3:
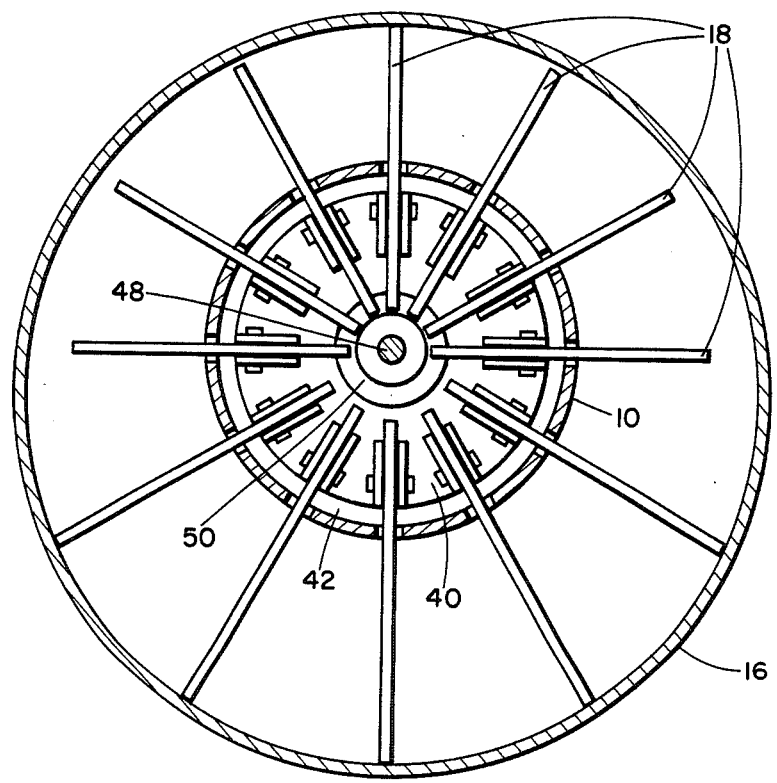
FIG. 3 is a sectional view taken along lines 3—3 of FIG. 2.

Referring now to FIGS. 1, 2 and 3, the pipeline pig of this invention comprises a longitudinal housing 10 of given length L, between a forward elastomeric disc 12 and a similar rearward elastomeric disc 14, which are adapted to sealably engage with the interior wall of pipeline 16 and thus to propel the pig by the flow of fluid through a pipe line. Intermediate the housing are a plurality of feeler arms 18 which are resiliently outwardly biased to normally slideably engage the interior of the pipeline until the housing traverses a bend in the pipeline 16, as shown. The feeler arms 18 are positioned such that when the apparatus is in a straight portion of the pipeline the contact points of the arms are intermediate the distance between discs 12 and 14 as a reference point.

An odometer, generally designated by the numeral 20, comprises a pair of outwardly biased arms 22 and 24, which have wheels 26 and 28 in rolling contact with the pipeline interior. As shown in FIG. 2 one type of odometer utilizes a magnet 30, embedded in the wheel 28. A magnetically actuated switch 32 is caused to send an electrical signal or impulse as magnet 30 passes. This signal is transmitted by wire 34 to a recording system found in housing 36. The recording system may be of the type described in U.S. Pat. No. 3,755,908 the disclosure in which patent is incorporated herein by reference.

Feeler arms 18 are supported within housing 10 by a plate 40 which, in turn, is attached to plate 42 which is also attached to the hosing 10 by suitable fasteners 44 and 46, respectively. An indicator rod 48 is supported for reciprocal motion within plates 40 and 42 and is normally biased toward the right, in FIG. 2 by a spring 50 operating against cam plate 52 which is attached to rod 48. During the operation, feelers 18 will normally ride against cam 52 until a bend is traversed at which time those feelers adjacent the near side of the bend will cause the rod 48 to be moved to the left, which motion is recorded in housing 36 utilizing a device such as disclosed in U.S. Pat. No. 3,755,908.

FIG. 3 is a cross-sectional view showing the attitude of the feeler arms 18 when the pig is in a bend in the pipeline 16.

Figure 4:
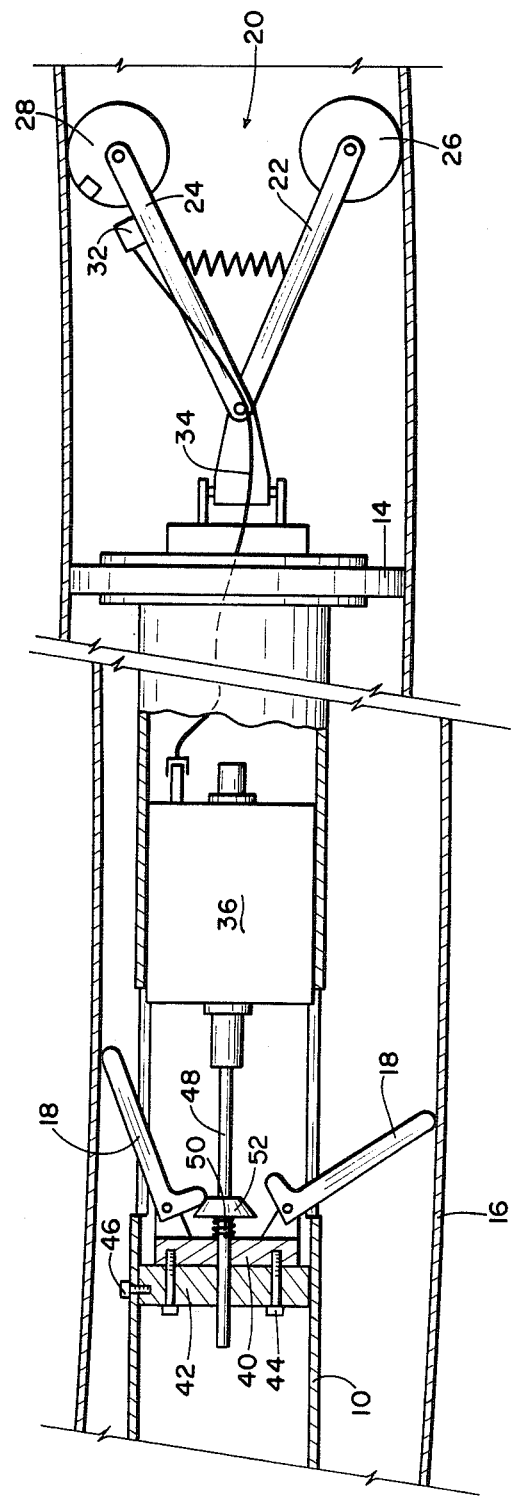
FIG. 4 is a partial sectional view, partly cutaway of another embodiment.

FIG. 4 represents an alternate embodiment wherein the odometer mechanism is positioned at the rearward end of the pipeline pig, wherein like numerals for like parts have been utilized.

Figure 5:
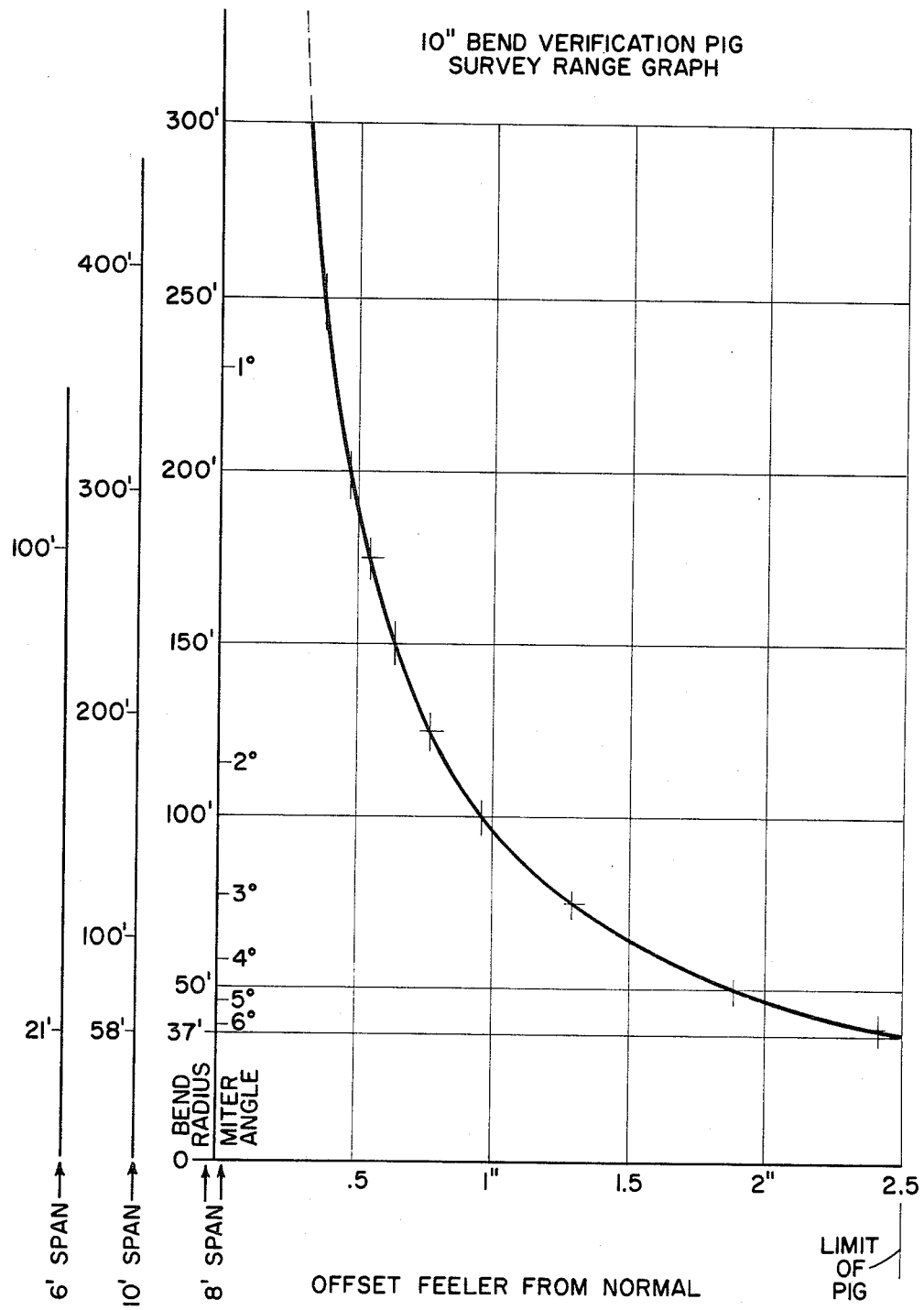
FIG. 5 is a graphic indication of the feeler arm deflection relative to the radius of bend for six-foot, eight-foot and ten-foot longitudinal housing spans within a ten-inch pipe.

FIG. 5 is a graphic display wherein the measurement of the offset of the feeler from the normal diameter of the pipe will give an indication of the bend radius and/or miter angle for a housing wherein L is six feet, eight feet and ten feet.

Referring again to FIG. 4 an example of means of recording the occurrence of bends in a pipeline is shown. Within the housing 36 is a mechanism including a supply roller 53 and a paper take-up roller 56. When a run is initiated in a pipeline substantially all of the paper is on a supply roller 53. As the run proceeds, by operation of a paper drive mechanism 54, paper is gradually wound onto the take-up roller 56. Shaft 48 has a marking pen 58 at the inner end. As paper 60 passes pen 58 a mark 62 records the vertical movement of shaft 48. As long as the pig is in a straight length of pipe the shaft 48 is not moved; however, when the pig encounters a bend in a pipe so that the pig body central portion is moved closer to the one wall of the pipe, shaft 48 is deflected as indicated by 62B on the chart to show such deflection. By measurement of the amount of deflection the angle of the bend can be determined.

To locate the position of a deviation in the pipeline traversed by the pig a signal is generated by odometer wheel 28. By means of magnet 30 and magnetic switch 32 spacing marks 64 are inscribed on paper 60. This may be done by a marking element 66 actuated in response to the closing of switch 32 by magnet 30. It is not necessary that a mark be placed on each revolution of wheel 28. By the use of a divider network the markings can be arranged to be spaced at selected distances such as every 50 feet, every 100 feet, or any other distance desired. By countng the markings on paper 60 when a run through a pipeline has been completed, the operator can accurately determine the location of a bend or deviation in the pipeline.

In FIG. 1 the feeler arms 18 are shown as extending downwardly from the body of the member but in an arrangement when the pig is passing a bend in the pipeline that is, the arms which are opposed to the direction of radius of the bend do not engage the pipe wall. In FIG. 3 the arms 18 are shown in contact with the pipe around the full perimeter thereof even when the pig is passing a bend. It can be seen that this is a matter of choice of design. The only critical thing is that the feeler arms engage the pipe wall around the full interior perimeter of the pipe when the pig is in a straight section so that the arms will be deflected inwardly when the pig passes a radius in the pipe. Further, it can be seen that by means of springs the feeler arms 18 could be maintained inwardly biased against the cam plate 52 so that only the arm or arms in the direction of the radius of a bend are in contact with a pipe while the other arms will be held out of engagement with the pipe. It is apparent that the only requirement is that the arms, the cam 52, and spring 50 be arranged in such a way that the arms extending in the direction of the maximum inward pipe wall intrusion caused by the radius of curvature of a pipe will engage the pipe wall to deflect shaft 48 as the pig moves through a bend in the pipeline.

The bend verification pig of this invention is similar in some respects to a caliper pig which has been in commercial use for some time to detect deviations in the interior wall of a pipeline. U.S. Pat. No. 3,755,908 is an example of a caliper pig. The present invention, while employing a mechanism similar in some respects to a caliper pig, functions in a different way and for an entirely different purpose. The caliper pig is normally employed with a fairly short body length so as not to be affected by bends or direction changes of the pipe axis. The caliper pig instead responds only to out-of-roundness of the pipe interior. The present invention employs a pig having a relatively long body so that the midpoint of the body moves towards the maximum intrusion caused by the radius of curvature of a pipeline when the pig is passing a bend in the pipeline. The caliper pig of U.S. Pat. No. 3,755,908 will not normally respond to or indicate a curvature change; whereas in practicing the present invention, the pig indicates to an operator when a bend or direction change of the pipeline axis is encountered.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A bend verification pig for indicating curvature in a pipeline having a fluid medium flowing therethrough, comprising:
   an elongated rigid housing of size to traverse within a pipeline and defining a longitudinal axis;
   support members fixedly secured at spaced locations on said housing, each support member being of diameter so as to support said housing at each of the spaced locations centrally within the interior of a pipeline;
   sensing means supported at an intermediate portion of said housing between and spaced from said support members and configured to follow the pipe wall and to indicate the relative position of said intermediate portion and the pipe wall; and
   means affixed to said housing and responsive to the flow of fluid medium to cause the propulsion of said housing through a pipeline.

2. A bend verification pig according to claim 1 wherein said sensing means includes:
   a plurality of spaced apart feeler arms each pivotally supported at one end to said housing, the other end extending for engagement with the interior of a pipeline;
   a shaft supported by said housing, the shaft being axially displaceable; and
   a cam plate received coaxially on said shaft, said feeler arms being in engagement with said cam plate whereby the cam plate and thereby said shaft is displaced in response to the deflection of said feeler arms.

3. A bend verification pig according to claim 1 wherein said means to cause the propulsion of said body through a pipeline includes the arrangement wherein at least one of said support members functions to impede the flow of fluid through the pipeline to thereby cause said housing to move through a pipeline by the force of fluid flow.

4. A bend verification pig according to claim 1 including:
   spring means biasing said shaft and thereby said feeler arms in the direction to cause said feeler arms to engage said pipeline inner wall surface.

5. A bend verification pig according to claim 1 pipeline including:
   means to identify the location of an indicated pipeline curvature change.

6. A bend verification pig according to claim 5 wherein said means to identify the location to an indicated curvature change includes an odometer wheel supported to said housing and biased to engage the interior wall of a pipeline.

7. A bend verification pig according to claim 2 including:
   instrumentation means carried by said housing for recording the axial displacement of said shaft.

8. A bend verification pig according to claim 7 wherein said instrumentation includes:
   means of recording odometer generated information in coordination with said recording of the axial displacement of said shaft.

9. A bend verification pig according to claim 1 in which the sensing means is a plurality of radially extending feeler arms pivotally connected to said housing at said housing intermediate portion.

* * * * *